United States Patent Office.

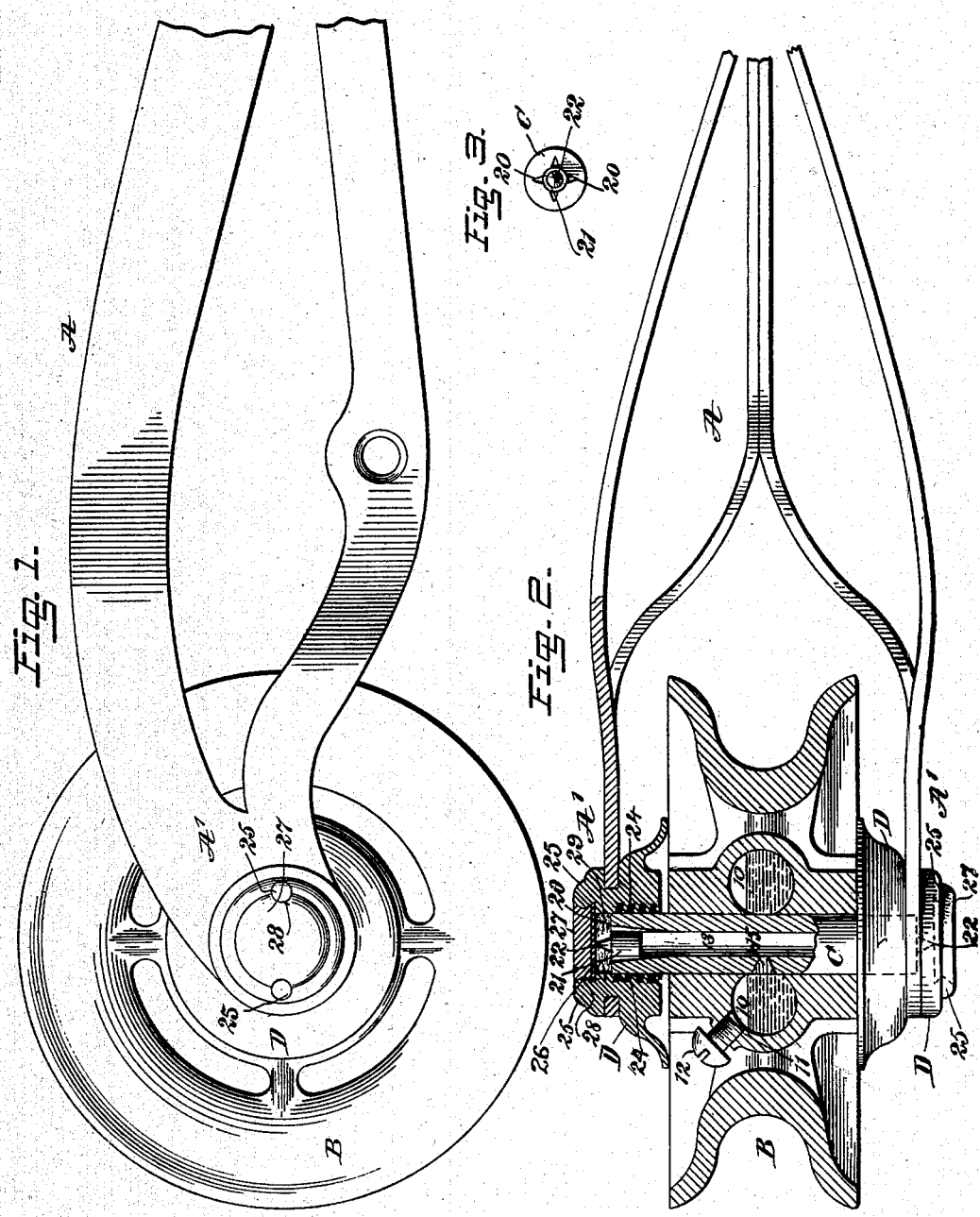

JOHN HENRY WALKER, OF LEXINGTON, KENTUCKY.

CONTACT FOR TROLLEY-HARPS.

SPECIFICATION forming part of Letters Patent No. 714,268, dated November 25, 1902.

Application filed February 12, 1902. Serial No. 93,703. (No model.)

*To all whom it may concern:*

Be it known that I, JOHN HENRY WALKER, a citizen of the United States, and a resident of Lexington, in the county of Fayette and State of Kentucky, have invented a new and Improved Contact for Trolley-Harps, of which the following is a full, clear, and exact description.

The purpose of the invention is to provide positive and decided contact-points for a trolley-harp which will constitute a journal for the pin or axle supporting the trolley-wheel and to so construct the contact-points that the rotary motion of the trolley-wheel will be impeded but very little, as the improved contact-points are more free from friction than the ring or brush contact usually employed.

A further purpose of the invention is to provide a contact for trolley-harps which will be thoroughly protected from the action of the weather and from blows and arcs and also to provide means for lubricating the contact-points and bearings from the hub of the trolley-wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the upper portion of a trolley-harp and trolley-wheel having the improved contacts applied. Fig. 2 is a partial horizontal section through that portion of the harp shown in Fig. 1, a horizontal section through the trolley-wheel, and a sectional plan view of the contacts; and Fig. 3 is an end view of the supporting-pin for the trolley-wheel and one of the contact-points.

A represents a portion of the trolley-harp, the prongs A' of which are of spring material and have a tendency to approach each other, and B represents the trolley-wheel provided with an annular hub-chamber 10, adapted to receive a lubricating material, being provided with an inlet 11, normally closed by a screw-plug 12 or other form of cap, and the hub-chamber 10 is further provided with an outlet-opening leading into the bore of the hub.

A tubular pin or journal C is permanently forced through the bore of the hub of the wheel in such manner that the hub and pin or journal are virtually integral, insuring the hub and pin turning together. The pin or journal C extends a desired distance beyond the sides of the hub, and a communication is established between the lubricating-chamber 10 of the wheel and the bore 13 of the pin through a diametrical opening 15 in registry with the outlet of the said hub-chamber and leading from the exterior of the pin to its bore, as is shown in Fig. 2.

The pin or journal C of the trolley-wheel is adapted to turn at its outer ends in bearings D at the ends of the spring-prongs A' of the harp. Longitudinal inwardly-tapering channels 20 are formed at each end of the pin or journal C in the walls of the bore 13, as is shown in Figs. 2 and 3, and at each end of the pin C a central plug 21 is produced, which plugs are of hardened steel and are provided with centrally-located conical points 22 at their outer ends adapted when the plugs are in position to extend beyond the ends of the pins C, as is especially shown in Fig. 2.

The bearings D are of brass and are in the nature of bosses extending from the inner face of the prongs of the harp. Each bearing has a central opening in which the ends of the pins C are snugly fitted, yet free to turn, as is also shown in Fig. 2, and at the inner end portions of the bearings interior spiral grooves 24 are formed filled with graphite or a like material.

The bearings D extend beyond the inner and outer faces of the prongs A' of the harp, as is clearly shown in Fig. 2, and to that end openings are made in the said prongs receiving the central exterior portion of the bearings, and preferably the connection between the bearings and the prongs of the harp is so made that the bearings will engage with the inner and outer faces of the prongs at points beyond the walls of the said openings, as is also shown in Fig. 2. The prongs may be sprung over the bearings in any suitable or approved manner or the bearings may be cast upon the prongs.

Spurs 25 extend from the outer faces of the bearings D, adjacent to the bores of the bearings, and brass plates 26 are placed over the outer end portions of the bearings and steel washers 27 are placed on the said plates, fitting between the spurs 25 of the bearings, and these steel washers are provided with recesses 28, which are brought opposite the spurs 25 of the bearings, and the said spurs are riveted or otherwise forced down into the said recesses and serve to hold the steel cap-plates 27 in position.

When the parts have been all assembled, the points 22 will bear against the brass plates 26, as is shown in Fig. 2, and as the journal or pin of the wheel turns with the wheel the ends of the pin will turn in lubricated bearings, and the contact-points in engagement with the brass plates 26 will likewise turn in a lubricating material, since the space between the outer ends of the pin or journal C and the brass plates 26 of the bearings is provided with a filling 29 of an absorbent material.

The brass plates 26 virtually constitute a brass lining for the cap plates or washers. The contacts above described are especially for the purpose of keeping an electric current from breaking and forming arcs in the bearings and on the journals carrying the trolley-wheel. The spring construction of the prongs of the harp admit of them holding the contact-points of the pin or journal C at all times in contact with the brass linings 26 of the hardened-steel cap-plates 27, such contact being maintained against all jars and lateral and up-and-down motion that is likely to be imparted to the same while the car is running.

Having thus described my invention, I claim as new and desire to secure by Letters Patent—

1. In a trolley-harp, bearings attached to the prongs of the harp, a pin or journal secured to the trolley-wheel, and projecting beyond the sides of the hub of said wheel, said pin or journal being mounted in said bearings and terminating in hard-metal points, and plates secured to and closing the outer ends of the said bearings, and with which the said hard-metal points engage, for the purpose specified.

2. A trolley-harp, bearings attached to the inner faces of the prongs of the harp, a pin or journal for the trolley-wheel, turning therewith, which pin or journal is mounted at its ends in said bearings, hard-metal contact-points located at the end portions of said pin or journal, brass plates fitted in the said bearings, with which the said contact-points engage, and hard-metal cap-plates held by the bearings in engagement with the outer faces of the said brass plates, as and for the purpose set forth.

3. A trolley-harp having spring-prongs, bearings attached at the inner faces of the prongs, extending through them, cap-plates provided with brass linings for the outer ends of the bearings, a tubular pin or journal for the trolley-wheel, the ends of which pin or journal are mounted to turn in the said bearings, the said pin or journal being provided with a peripheral opening leading into its interior and end grooves in its bore, contact-plugs located in the end portions of the pin or journal, which contact-plugs have outwardly-extending points arranged for engagement with the brass linings of the cap-plates, and means, substantially as described, for supplying lubricating material to the interior of the pin or journal, as set forth.

4. In contacts for trolley-harps, a hollow pin or journal for the trolley-wheel, having hard-metal points secured in its ends, for the purpose described.

5. In contacts for trolley-harps, a tubular pin or journal for the trolley-wheel, said pin or journal having an aperture leading into its bore and tapering grooves in its inner end walls, hard-metal plugs inserted in the end portions of the pin or journal, and points also of hard metal extending from the outer ends of the plugs and beyond the ends of the pin or journal, for the purpose described.

6. A trolley-pole harp having spring-prongs, bearings carried by said prongs, said bearings having grooves filled with graphite and provided with spurs extending from their outer ends, cap-plates covering the outer ends of the said bearings and provided with brass linings, a tubular pin or journal provided with an opening leading to its bore, and with longitudinal tapering end grooves, hard-metal plugs inserted in the ends of the said pin or journal, terminating at their outer ends in points engaging with the brass linings of the cap-plates, and a trolley-wheel secured upon the said pin or journal, provided with a chamber for a lubricant, having communication with the opening in the pin or journal leading to its bore, for the purposes set forth, and whereby the said points are protected against the weather, as specified.

7. In contacts for trolley-harps, the combination with a harp having spring-prongs, of bearings secured to the ends of the prongs and having closed outer ends, and a trolley-wheel provided with a trunnion projecting from each face of its hub, said trunnions being mounted in the bearings and having at their ends hard-metal points engaging the inner faces of the outer ends of the bearings, as set forth.

8. In contacts for trolley-harps, the combination with a harp having spring-prongs, of bearings secured in the ends of the prongs and having closed outer ends, and a trolley-wheel provided with a pin or journal secured therein and having its ends projecting beyond the faces of the hub of the wheel, said journal being mounted in the bearings and provided at its ends with hard-metal points engaging the inner faces of the closed end of the bearings, as set forth.

9. In contacts for trolley-harps, a bearing having spurs formed on its outer face, and a plate provided with recesses opposite the spurs, whereby when the spurs are riveted the plate will be held in place in the bearing, as set forth.

In testimony whereof I have signed my name to this specification in the presence of two subscribing witnesses.

JOHN HENRY WALKER.

Witnesses:
JOHN E. BERKLEY,
THOS. P. FISHBACK.